May 17, 1938.  T. F. BRANDT  2,117,696
POTHEAD
Filed Sept. 28, 1935
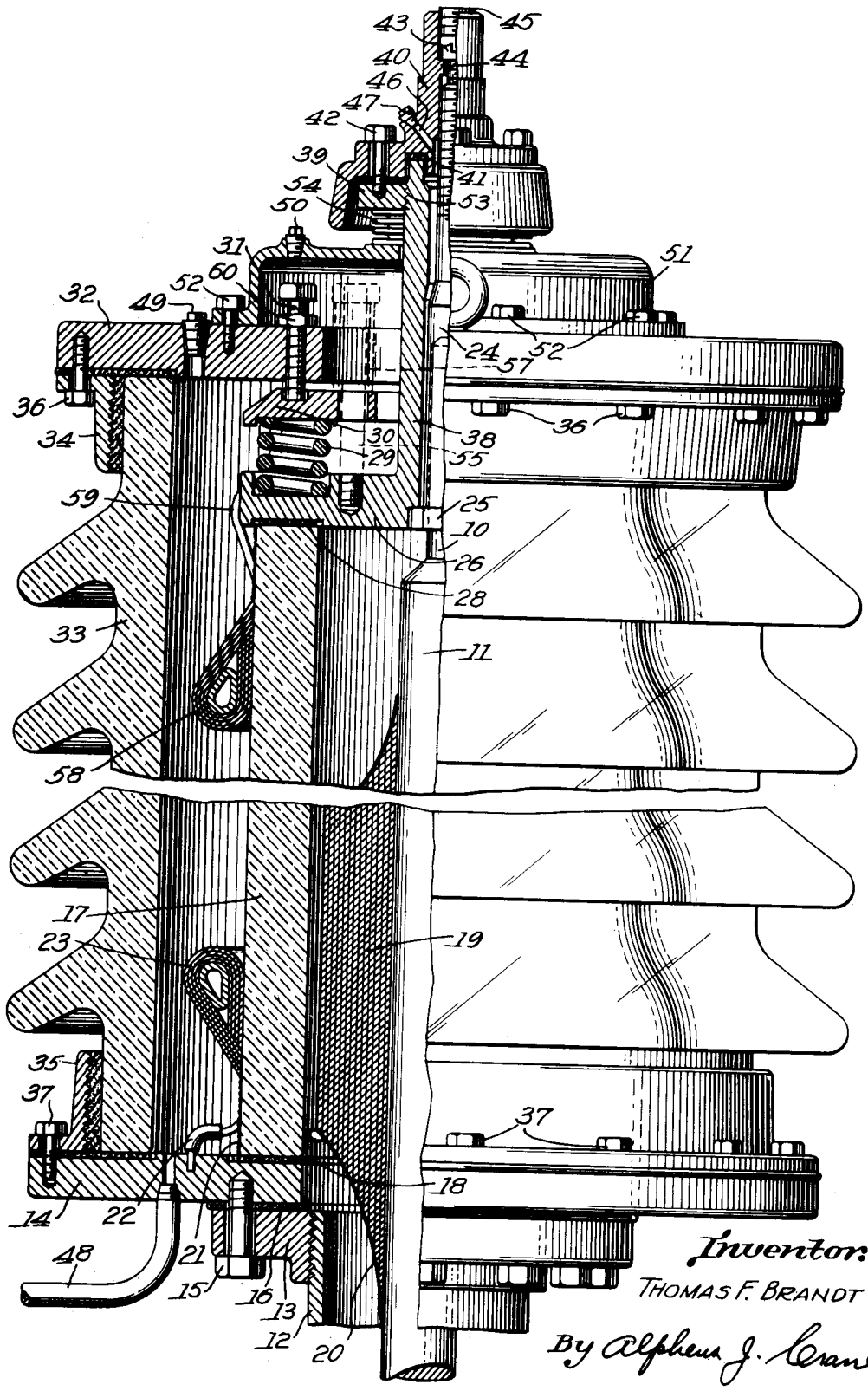
Inventor:
Thomas F. Brandt
By Alpheus J. Crane
Attorney.

Patented May 17, 1938

2,117,696

UNITED STATES PATENT OFFICE 2,117,696

POTHEAD

Thomas F. Brandt, Barberton, Ohio, assignor to The Ohio Brass Company, Mansfield, Ohio, a corporation of New Jersey Application September 28, 1935, Serial No. 42,649

15 Claims. (Cl. 247—6)

This invention relates to potheads for high pressure cables in which the cables are enclosed in pipes or conduits filled with insulating oil under high pressure.

One object of the invention is to provide a pothead or outlet for a high pressure cable in which the joints subjected to the high pressure are spring held to prevent danger of leakage.

A further object of the invention is to provide a pothead in which the danger of breakage of the insulating members is reduced to a minimum.

A further object of the invention is to provide a pothead which is readily adapted to cables of various diameters and which can be readily installed.

A further object of the invention is to provide a device of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing the figure is a half elevation and half section with parts broken away showing one embodiment of the present invention.

In the embodiment shown, the numeral 10 designates a conductor cable wound with insulation 11 in a well known manner and enclosed in a pipe or conduit 12. A flange collar 13 is secured to a base 14 for a pothead by means of cap screws 15, a gasket 16 being placed between the collar and base to insure a tight joint. An insulating sleeve 17 which may be made of porcelain rests at one end upon the upper face of the base 14, the gasket 18 being interposed between the end of the sleeve and base to form a tight joint. The opening in the sleeve 17 is of sufficient diameter to accommodate a wrapping 19 of insulating material, such as paper or cambric, about the insulation 11 of the cable 10. This wrapping reinforces the insulation 11 of the cable at the point where it enters the pothead so as to prevent danger of breakdown within the pothead. The insulation 19 is tapered at the point where it leaves the conduit 12 so as to provide a gradual tapering off of the electrostatic stress at this point, the tapering surface being covered with a conducting coating of metal or other suitable material 20 which forms a screen for distributing the electrostatic stress and preventing concentration at any one point on the insulation of the cable. The outside of the dielectric sleeve 17 is metallized at 21, the metallized surface being grounded upon the plate 14 by a jumper 22 soldered to the surface and to the plate 14. An insulated flux distributing member 23 is arranged at the upper termination of the coating 21 and consists of an internal conductor electrically connected to the coating 21 and surrounded by insulting material. The form of flux control shown in Patent No. 1,972,590, granted Sept. 4, 1934 to Ralph Higgins, has been found suitable for this purpose.

The insulation 11 of the cable is covered by a wrapping of thin sheet metal which is at ground potential, and the flux control 26 is a continuation of this metal covering and forms the termination thereof. The tapered end of the insulation 19 provides a gradually increasing spacing of the ground potential member 20 from the high potential conductor 10 and thus avoids abrupt termination of the grounded covering and consequent concentration of flux. The gradual distribution of the electrostatic field thus secured, avoids danger of puncture at the termination of the grounded covering for the cable. The pipe 12, base 14 and metallic coating 21 are also at ground potential so that the flux control 23 provides further distribution of the electrostatic stress at the termination of the grounded covering for the cable. It will be seen that the amount of wrapping 19 can be regulated to suit various cable diameters and the tapered control 20 will extend from the metal wrapping on the surface of the cable 11 no matter what diameter of cable is used. This provides an arrangement of the flux control that is easily accommodated to cables of a large range of diameters. Since the flux control on the outside of the tube 17 need not extend inwardly to the surface of the cable, the tube 17 may be made large enough to accommodate a wide range of cable diameters and the variable space between the cable and tube is cared for by the variable wrapping 19 and variable flux control 20. The end of the conductor 10, which of course is at high potential when the cable is in use, is soldered or otherwise secured to an extension 24 having a non-circular flange 25 fitting into a similarly shaped recess in the top flange 26 which rests upon the upper end of the insulating sleeve 17; a gasket 28 being provided to insure a tight joint at this point. The top flange 26 is pressed against the gasket 28 by a series of helical springs 29 distributed around the periphery of the flange and held in place by a ring 30. The ring 30 is pressed upon the springs 29 by a series of pressure screws 31 which are threaded in a cover plate 32 which is supported on an outer dielectric sleeve 33, the lower end of the outer sleeve resting upon the base 14. The ends of the sleeve 33 are provided with flanges 34 and 35 respectively which are cemented to the ends of the sleeves, the upper flange 34 being secured to the cover plate 32 by a series of cap screws 36 while the lower flange 35 is secured to the base plate 14 by a series of cap screws 37. Gaskets are interposed between the ends of the sleeve 33 and the base plate and cover plate respectively to provide tight joints, the gaskets being held in compression by the cap screws 36 and 37.

The top flange 26 is provided with an upwardly extending hollow neck 38 which passes through openings in the ring 30 and cover plate 32 and has a flange 39 threaded on its upper end. The conductor extension 24 projects beyond the end of the neck 38 and receives a terminal cap 40 threaded onto the conductor extension. The terminal cap 40 is pressed down against a gasket 41 disposed between the upper end of the neck 38 and the terminal cap by means of cap screws 42 which insure a tight joint between the terminal cap and the neck 38. A screw 43 rests upon a shoulder 44 within the terminal cap 40 and is threaded into the upper end of the extension 24. When the screw 43 is tightened up, it will produce firm contact between the surface of the threads on the extension 24 and terminal cap 40 so as to insure good electrical connection between the terminal cap and conductor 10. After the screw 43 has been tightened, a pipe plug 45 is inserted into the end of the terminal cap to provide a tight joint at this point. The terminal cap 40 is provided with a vent 46 to permit escape of air from the high pressure chamber in the pothead when the pipe 12 and the connecting portion of the pothead is filled with oil under high pressure. The vent 46 is closed by a pipe plug 47 after the pothead has been filled. The outer chamber of the pothead is filled with oil under low pressure through the pipe 48; vents 49 and 50 being provided to permit escape of air during filling of the outer chamber. Pipe 48 may be connected with an external reservoir to maintain the oil at a proper pressure within the outer chamber.

The joints 18 and 28 that must withstand the heavy pressure are kept constantly tight by the pressure of the springs 29, which pressure can be adjusted by the screws 31. If the gaskets 18 and 28 should shrink or become compressed or if there should be a loosening of these joints, due to any other cause, the springs 29 will automatically press the flange 26 downwardly to correct such loosening.

It will be apparent that in order for the springs 29 to be effective, there must be provision for relative movement between the members 26 and 32. The neck 38 moves freely in the opening in the cover plate 32 and in order to provide a tight closure for the outer chamber, a closure cap 51 is placed over the opening in the cover plate 32 and secured in place by cap screws 52. A suitable gasket may be interposed between the lower edge of the cover cap and the top face of the plate 32. The neck 38 passes freely through a central opening in the cap 51 and forms a tight joint at its threaded connection 53 with the flange 39. This joint may be soldered after the parts have been assembled to insure that no leakage will take place at this point. An expansion bellows 54 has its upper end soldered to the plate 39 and its lower end soldered to the cover cap 51 so as to complete the tight closure at the upper end of the outer chamber. This bellows will provide for any movement of the plate 26 and neck 38 under the action of the spring 29 necessary to maintain the joints 18 and 28 tight and, at the same time, it will keep the space for the low pressure oil in the tube 33 tightly closed. The tube 17 which is under heavy tension stress, due to its internal oil pressure, is placed under compression by the springs 29. Porcelain has many times the strength under compression that it has under tension so that the compression load of the springs 29 does not materially add to the burden sustained by the porcelain but, as a matter of fact, counteracts to some extent the tension produced by the internal pressure, particularly that exerted in the direction of the axis of the tube. The reaction of the springs 29 of course exerts a tension on the outer tube 33 but this outer tube is much larger than the inner tube 17 and consequently has a greater amount of material to withstand the force of tension. Moreover, the pressure within the tube 33 is very small so that the reaction of the springs 29 is substantially the only force to which the tube 33 is subjected. The compressive force on the tube 17 can be applied by direct contact with the ends of the tube so that it is not necessary to cement any contact device to the inner tube. This is a great advantage since cemented joints are very apt to be weakened in time if they are covered with oil, but the flanges 34 and 35 can be securely cemented to the outer tube 33 for receiving the force of tension and the usual Portland cement joint can be employed and it can be provided with suitable treatment to compensate for thermal changes since these joints are on the outside of the pothead and consequently not in contact with the oil with which the pothead is filled.

To facilitate assembly, the springs 29 may be held in compression by removable bolts 55 which are threaded into blind openings in the top flange 26 and extend loosely through holes in the ring 30 and are provided with sleeves 57 which hold the spring 29 under compression.

The pothead may be completely assembled at the factory before shipment except for the connection to the cable, and may be readily installed in the field with very little labor and without requiring specially skilled workmen.

When it is desired to install the pothead, the cable is first made up by removing a portion of the thin metal sheath, exposing the wrapping 11 at the end of the cable; a portion of the end of the cable itself being exposed to permit the extension 24 to be soldered in place. A sufficient amount of wrapping 19 is placed upon the cable to approximately fill the opening in the inner tubular member 17 and the flux control 21 is applied to the tapered end of the wrapping 19 and in contact with the metallic sheath on the outside of the cable insulation so as to form a continuation of the sheath, as heretofore explained.

The terminal cap 40 is first removed from the pothead by removing the screws 42, after which the entire pothead may be lowered over the end of the cable, the cable being drawn up through the pothead if necessary by a lead secured to the end of the cable. The plug 45 and the screw 43 will of course be removed during this operation. After the pothead is in place, all that is necessary is to attach the plate 14 to the flange 13 by the cap screws 15 and tighten the plate down upon the gasket 16 and then replace the terminal cap 40 upon the upper end of the pothead, the cap being tightened down upon the gasket 41 by means of the screws 42 after the terminal has been threaded into place on the extension 24.

It is not necessary to attempt to produce a tight joint upon the gasket 41 by means of threads on the extension 24. The terminal member is merely screwed down loosely and the openings for the bolt 42 located in registration with the threaded openings in the flange 39. The joint formed by the gasket 41 is made tight by the cap screws 42. The screw 43 is then tightened up to insure good electrical contact between the threads on the terminal cap and the extension 24, and the end of the cap finally closed by the pipe plug 45. Oil under pressure may now be admitted into the conduit 12 and the interior chamber of the bushing, the pipe plug 47 being removed until the oil begins to escape from the vent 46, after which the plug is inserted and the oil pressure brought up to the desired amount. The outer chamber may then be filled through the pipe 48, the vent plugs 49 and 50 being removed until the outer chamber is filled. It will be apparent that the pothead is adapted to cables of various sizes, the only variation necessary for cables of different sizes being the provision of the proper size opening in the extension 24 for receiving the end of the cable and the application of the proper amount of winding 19 to bring the insulation up to a size approximating the interior diameter of the tube 17.

In assembling the pothead initially at the factory, the inner tube 17 is placed on the plate 14 and the jumper 22 soldered in place. The cover flange 26 is then placed on top of the tube, the springs 29 being held in compression by the temporary bolts 56. After the jumper 59 is soldered in place, the outer tube 33 may be placed in position on the base 14 and fastened down by the screws 37. The top plate 32 may then be fastened to the top of the tube 33 by the screws 36, after which the screws 31 are tightened down upon the plate 30 to take the pressure of the springs 29 and are locked in place by lock nuts 60. The temporary screws 55 may then be removed and the closure member 51 placed in position and secured by the screws 52. The expansion bellows 54 and the flange 39 are then assembled and the joints soldered to insure tight closure for the upper end of the outer chamber. The terminal cap 40 is then placed in position and the device is ready for shipment.

I claim:

1. A high pressure pothead comprising an inner dielectric sleeve for containing insulating fluid under high pressure, fittings at opposite ends of said sleeve, springs for holding said fittings against the ends of said sleeve and placing said sleeve under compression, the force of compression being transmitted from one of said fittings to the other through said sleeve and means comprising a tension member outside of said sleeve for connecting one of said fittings with said springs and for withstanding the reaction of said springs.

2. The combination with a cable enclosed in a high pressure conduit, of a fitting connected with the end of said conduit, a dielectric sleeve having one end thereof bearing against said fitting, the interior of said sleeve communicating with the interior of said conduit, said cable extending through said sleeve, a terminal fitting electrically connected with said cable and bearing against the other end of said sleeve, resilient means for holding said fittings in contact with the ends of said sleeves respectively to maintain tight joints between said sleeve and fittings, and a tubular insulating member surrounding said sleeve and connecting said fittings and withstanding the reaction of said resilient means, said tubular insulating member and said fittings forming a chamber about said sleeve.

3. A pothead for an electric cable comprising inner and outer dielectric sleeves, terminal plates secured to the opposite ends of said outer sleeve, one end of said inner sleeve having bearing connection with one of said terminal plates, a terminal flange bearing against the other end of said inner sleeve, resilient means pressing said terminal flange against said inner sleeve and pressing said inner sleeve against one of said terminal plates, the other of said terminal plates forming an abutment for said resilient means.

4. The combination with a cable and an enclosing conduit for insulating fluid under high pressure, of a terminal plate connected with one end of said conduit, a dielectric sleeve having one end secured to said terminal plate, a second terminal plate secured to the opposite end of said dielectric sleeve, a second dielectric sleeve disposed within said first named sleeve and having one end thereof bearing against one of said terminal plates, a terminal flange bearing against the other end of said second dielectric sleeve, resilient means interposed between said terminal flange and one of said terminal plates and exerting pressure on said flange and on said second named sleeve to maintain tight joints at the ends of said second named sleeve, said terminal plates forming abutments for receiving the reactive force exerted by said resilient means, said reactive force being transmitted by said terminal plates to said first named dielectric sleeve and holding said first named dielectric sleeve in tension.

5. A pothead comprising a pair of dielectric sleeves disposed one within the other, a terminal plate having bearing connection with one end of each of said sleeves, a cable extending through said terminal plate into the inner one of said sleeves, a conduit surrounding said cable and having a tight joint with said plate, the interior of said conduit being in communication with the interior of said inner sleeve, a second terminal plate secured to the outer one of said sleeves at the end thereof opposite said first named terminal plate, a terminal flange bearing against the end of the inner sleeve opposite said first named terminal plate, and resilient means interposed between said terminal flange and said second named terminal plate and exerting compression on the inner sleeve and tension on the outer sleeve.

6. A pothead comprising spaced inner and outer dielectric sleeves, a terminal plate bearing against said sleeves at one end thereof and closing the space between said sleeves, separate relatively movable terminal members bearing against the opposite ends of said sleeves respectively, and resilient means interposed between said separate terminal members and pressing one of said terminal members against the end of said inner sleeve and holding said inner sleeve under compression while exerting tension on said outer sleeve.

7. A pothead comprising spaced inner and outer dielectric sleeves, a terminal member having bearing connection with one end of each of said sleeves and closing the space between said sleeves, a conduit communicating with the interior of the inner sleeve, a cable disposed in said conduit and extending through said inner sleeve, separate closure members for the ends of said sleeves respectively opposite said terminal member, said closure members being electrically connected with said cable and providing an outlet terminal therefor, said closure members being movable relative to each other, and resilient means interposed between said closure members and pressing the terminal members against the opposite ends of said inner sleeve respectively to form tight joints with said ends, the outer sleeve being held in tension by the reaction of said resilient means.

8. The combination with a cable and a conduit surrounding said cable for holding dielectric fluid under pressure about said cable, of an outlet pothead for said cable comprising a dielectric sleeve, a grounded terminal for said pothead having a tight joint with said conduit and having bearing connection with one end of said sleeve, a live terminal for said pothead having electrical connection with said cable and having bearing connection with the other end of said sleeve, the interior of said sleeve being in communication with the interior of said conduit, resilient means for holding said terminal members against the ends of said sleeve respectively, an abutment member for receiving the reactive stress of said resilient means, and a dielectric member disposed outside of said sleeve and connecting said abutment member with said grounded terminal for holding said abutment member in position relative to said grounded terminal.

9. The combination with a conductor cable having an insulating wrapping thereon and a conduit surrounding said cable and providing clearance between said wrapping and the interior of said conduit, of a pothead for said cable comprising a fitting secured to the end of said conduit, a dielectric sleeve having a tight joint with said fitting and providing clearance between said wrapping and the interior of said sleeve, a terminal member for said conduit insulated from said grounded terminal by said sleeve, a supplemental wrapping of dielectric material adapted to be increased or diminished in thickness to fill approximately the clearance space about said cable wrapping within said sleeve for cables of various diameters, the end of said supplemental wrapping being flared outwardly from the cable wrapping and a conductor coating on said flared end substantially bridging the clearance between said cable wrapping and the interior of said tubular member.

10. The combination with a conductor cable having an insulating wrapping and a conducting covering disposed over said wrapping and having an enclosing conduit for insulating fluid under pressure surrounding said cable, of an outlet pothead for said cable comprising a grounded terminal member having a tight joint with the end of said conduit, a dielectric sleeve bearing on said terminal member, the interior of said sleeve communicating with the interior of said conduit, a live terminal member connected with the end of said conductor and bearing on the opposite end of said sleeve, a supplemental dielectric wrapping surrounding the cable wrapping within said sleeve, said supplemental wrapping being tapered at the end thereof adjacent said conduit, and a tapered flux control member connected with the conductor covering for said cable, said flux control member being disposed over and conforming to the tapered end of said supplemental wrapping, said supplemental wrapping and conductor covering being capable of being increased or diminished to bridge the space between said cable wrapping and the interior of said dielectric sleeve for cables of various diameters.

11. The combination with a conductor cable having a conduit for containing high pressure insulating fluid about said cable, of an outlet pothead for said cable comprising a terminal member secured to said conduit, a pair of dielectric sleeves disposed one within the other and having bearing connection with said terminal member at one end of each of said sleeves and forming respectively inner and outer chambers, the inner chamber being in communication with the interior of said conduit while the outer chamber is separated from said inner chamber, separate end fittings for the ends of said chambers opposite said terminal member, resilient means interposed between said end fittings and holding the end fitting for the inner chamber against the end of the inner sleeve and resiliently maintaining a tight pressure joint between said inner sleeve and its end fitting, and flexible means connecting said end fittings to form a liquid tight joint therebetween while permitting relative movement of said end fittings.

12. A pothead comprising a pair of tubular dielectric members disposed one within the other, a common base member having bearing connection with one end of each of said dielectric members, separate end fittings for the other ends of said dielectric members, resilient means for holding the separate end fitting for the inner dielectric member in place, an abutment for the resilient means arranged to cooperate with the other of said separate end fittings, and removable means for temporarily connecting said abutment with the separate end fitting for the inner dielectric member to compress said resilient means during assembly of said pothead.

13. An insulating housing comprising outer and inner tubular members, a common end fitting for one end of both of said members, separate end fittings for the other ends of said members, means cemented to the outside of the outer member for securing its end fittings thereto, and compression spring means interposed between said separate end fittings for maintaining pressure on the joints between said inner tubular member and its end fittings.

14. An insulator housing comprising outer and inner tubular members, an end fitting for one end of both of said members, separate end fittings for the other ends of said members, means attached to the outside of the outer member for securing its end fittings thereto, and spring means cooperating with said separate end fittings for maintaining pressure on the joints between said inner tubular member and its end fitting, said spring means exerting pressure on said inner tubular member and tension on said outer tubular member, a conductor extending through said inner tubular member, and means for introducing an insulating fluid under pressure about said conductor within said inner tubular member.

15. A pothead comprising a base, an outer tubular member mounted on said base, means cemented to the outside of said tubular member for holding said tubular member to said base, a top fitting for said tubular member, means cemented to the outside of said tubular member for securing said top fitting to said member, an inner tubular member having one end thereof mounted on said base, a top fitting engaging the other end of said inner tubular member, spring means interposed between the top fitting for said outer tubular member and the top fitting for said inner tubular member, said spring means pressing said last named top fitting against said inner tubular member and said inner tubular member against said base, the reaction of said spring means being resisted by tension in said outer tubular member, a conductor extending through said inner tubular member, and means forming a liquid tight closure for the space between said outer and inner tubular members, said means providing for relative movement between the cover for said outer tubular member and the closure for said inner tubular member.

THOMAS F. BRANDT.